United States Patent [19]

Nakajima et al.

[11] 4,333,334

[45] Jun. 8, 1982

[54] KNOCKING DISCRIMINATION APPARATUS

[75] Inventors: Yasuo Nakajima, Yokosuka; Kazuhiro Kikuchi, Yokohama, both of Japan

[73] Assignee: Nissan Motor Company, Ltd., Yokohama, Japan

[21] Appl. No.: 143,715

[22] Filed: Apr. 25, 1980

[30] Foreign Application Priority Data

Apr. 26, 1979 [JP] Japan .................................. 54-51659

[51] Int. Cl.³ ............................................ G01L 23/22
[52] U.S. Cl. ........................................ 73/35; 123/425
[58] Field of Search ............................. 73/35; 123/425

[56] References Cited

U.S. PATENT DOCUMENTS 4,233,836 11/1980 Yoneda et al. ........................... 73/35

FOREIGN PATENT DOCUMENTS 461763 12/1949 Canada ................................... 73/35
609309 9/1948 United Kingdom .............. 73/35 X Primary Examiner—James J. Gill
Attorney, Agent, or Firm—Schwartz, Jeffery, Schwaab, Mack, Blumenthal & Koch

[57] ABSTRACT

A knocking discrimination apparatus in which an output signal derived from a knocking sensor is held at an almost constant level regardless of condition of an internal combustion engine by means of providing a control circuit therein for controlling the output signal of the knocking sensor to be held at the almost constant level, and further the above constantly held output signal of the knocking sensor and a constantly settled reference signal are compared with each other for discrimination of knocking, so that such a remarkable effect can be obtained that the reliability of the discrimination of knocking is improved exceedingly on account of a reliable reference signal for comparison ensured by being maintained at a constant level persistently and stably.

7 Claims, 23 Drawing Figures

Low Speed · Light Load

High Speed · Heavy Load

FIG.10a
(Sensor Output)
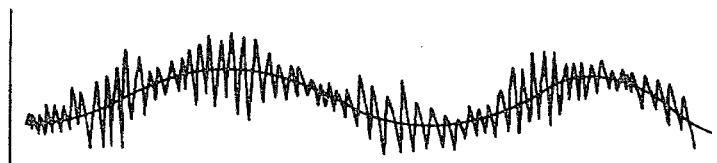
FIG.10b
(Highpass Filter
Output)
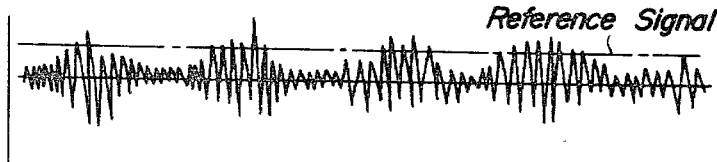
FIG.10c
(Comparator Output)
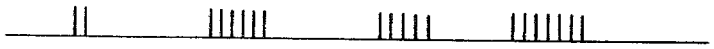
FIG.10d
(Counter Output)
FIG.10e
(Ignition Point
Signal)
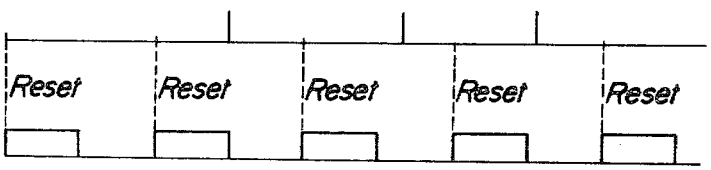
FIG.11a
(Counter
Output)
FIG.11b
(Ignition Point
Signal)
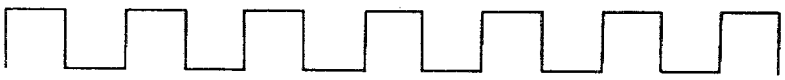
FIG.11c
(Equally Advancing
Angle Integration
Signal)
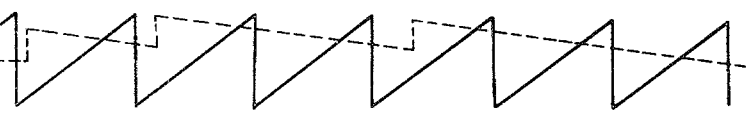
FIG.11d
(Retarding Angle
Signal)
FIG.11e
(Ignition Timing
Signal)
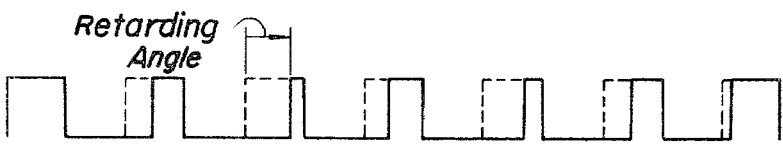

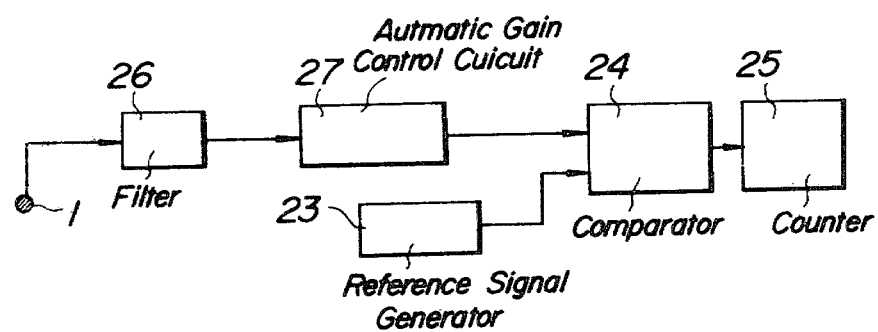

KNOCKING DISCRIMINATION APPARATUS

BACKGROUND OF THE INVENTION

1. Field of the Invention

The present invention relates to a knocking discrimination apparatus for detecting a knocking taking place in an internal combustion engine and discriminating a degree of magnitude thereof, for instance, so as to insure a favourable performance of the engine by controlling an ignition timing in response to the state of knocking.

2. Description of the Prior Art

It is well known that, although the continuation of a state of strong knocking in an ordinary internal combustion engine has an injurious effect upon the durability and others of the engine, an optimum state of an output power and a performance of fuel consumption can be obtained by a state of slight knocking under a condition of comparatively low speed operation of the engine. So that, such a conventional equipment has been provided that the performances of output power and fuel consumption are improved by shifting the ignition timing with response to the detected state of knocking of the engine, so as to maintain the state of slight knocking based on the above close relation between the knocking and the ignition timing. Accordingly, it is required for this kind of equipment to develop an apparatus for discriminating the magnitude and the state of the knocking accurately.

As a conventional knocking discrimination apparatus of this kind, such an apparatus as shown in FIG. 1 is well known. In this apparatus, an output of a vibration or a knocking sensor 1 which is fitted on the internal combustion engine proper and a reference signal derived from a reference signal generator 2 are compared with each other in a comparator 3, so as to discriminate that a knocking, the former caused by which is larger than the latter, is necessary to be brought under the predetermined control.

However, the conventional knocking discrimination apparatus provided with the above mentioned simple configuration has such a defect that the discrimination of the knocking cannot be effected correctly, because the output of the knocking sensor is varied in response to the operating condition of the engine, and large noise components other than that of knocking are intermixed.

Accordingly, such apparatus as shown in FIGS. 2(a), (b) are employed in practice. In the apparatus shown in FIG. 2(a), a vibration sensor having a high resonant frequency in a range of 20–25 KHz and a flat sensing performance in a frequency range of about 0–10 KHz is used as the knocking sensor 1, an output signal thereof being applied to a comparator 3 through a bandpass filter 4 provided with a passband coinciding with a frequency range of the knocking and a half-wave rectifier 5. A part of the output signal passing through the halfwave rectifier 5 is averaged over a certain time duration by an averaging circuit 6, so as to form the aforesaid reference signal to be applied to the comparator 3 by adding or multiplying a predetermined number thereto. According to the above mentioned circuit configuration, even if the output level of the knocking sensor 1 is varied in response to the variation of operating condition of the engine, the reference signal to be compared therewith is varied also therewith, so that the correct discrimination of the knocking can be effected regardless of the operating condition of the engine.

In the apparatus shown in FIG. 2(b), an output signal of a knocking sensor 1 being similar to that shown in FIG. 2(a) is applied to a comparator 3 through a bandpass filter 4 similarly. On the other hand, a reference signal to be compared therewith is formed by driving a function generator 7 in response to the number of revolution of the engine which exerts an important effect upon the output level of the knocking sensor 1 particularly. Accordingly, the reference signal can be varied with response to the variation of the output signal of the knocking sensor 1 similarly as in the apparatus shown in FIG. 2(a), so as to realize the correct discrimination of the knocking.

The statuses of the above mentioned comparisons between the output signal of the knocking sensor and the reference signal are shown in FIGS. 3(a) and (b) respectively, the former relating to an operating condition of low speed and light load and the latter relating to another operating condition of high speed and heavy load.

However, in the above mentioned conventional apparatus, such a system that the level of the reference signal is varied in response to the variation of the output signal of the knocking sensor is adopted, so that it is feared that the reliability of the discrimination of the knocking is lower than that which can be obtained in such a case that the reference signal for the comparison is fixed to a certain specified level.

SUMMARY OF THE INVENTION

The present invention has been devised by taking the mentioned above into consideration.

An object of the present invention is to provide a knocking discrimination apparatus having a high reliability.

The feature of the present invention is that the aforesaid high reliability for the discrimination of the knocking can be realized by fixing the reference signal to a certain specified level as well as controlling the output signal of the knocking sensor varied in response to the operating condition of the internal combustion engine by a controlling circuit provided for holding the above output signal at a certain constant level regardless of the operating condition of the internal combustion engine.

The present invention will be explained in detail hereinafter by referring to the accompanied drawings.

BRIEF DESCRIPTION OF THE DRAWINGS

FIGS. 10(a) to (e) are diagrams showing waveforms on various portions of the preferred embodiment of the knocking discrimination apparatus according to the present invention respectively;

FIGS. 11(a) to (e) are diagrams showing waveforms on various portions of the ignition timing regulation equipment shown in FIG. 4, respectively; and FIG. 12 is a block diagram showing another preferred embodiment of the knocking discrimination apparatus according to the present invention.

DESCRIPTION OF THE PREFERRED EMBODIMENTS

Figure 1:
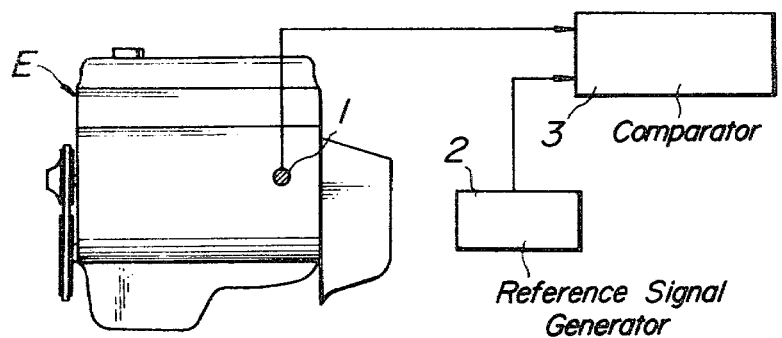
FIG. 1 is a block diagram showing a basic configuration of a conventional knocking discrimination apparatus as mentioned above.
Figure 2A:
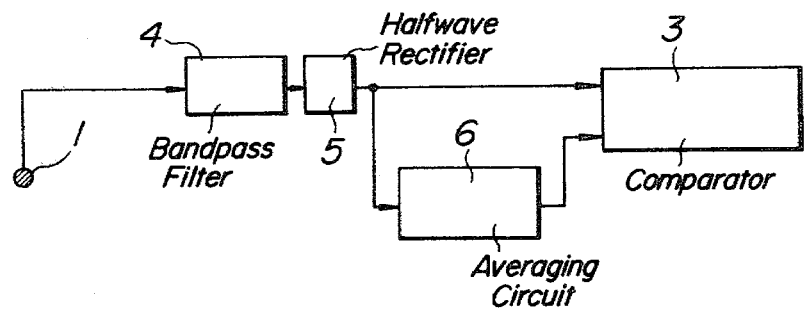
FIGS. 2(a) and (b) are block diagrams showing concrete examples thereof respectively as mentioned above.
Figure 2B:
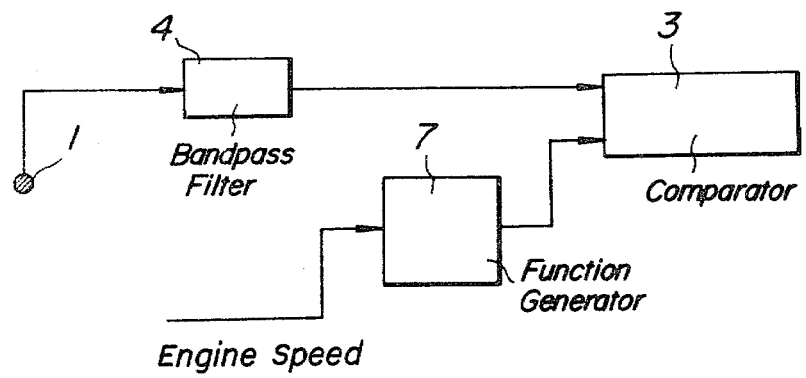
Figure 3A:
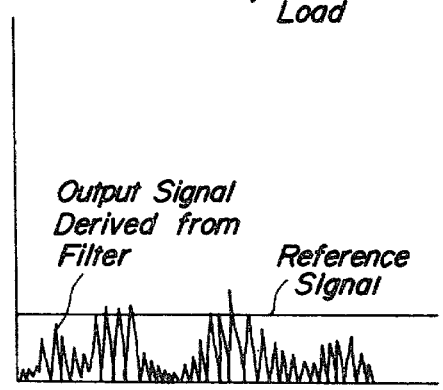
FIGS. 3(a) and (b) are graphs showing examples of the behaviour thereof respectively as mentioned above.
Figure 3B:
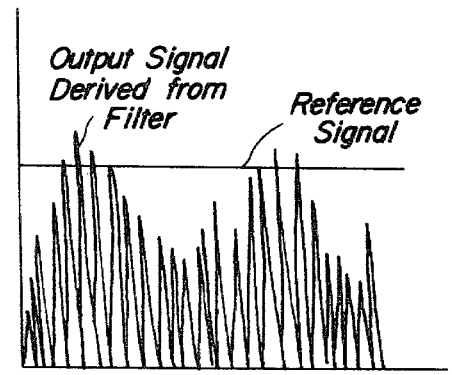
Figure 4:
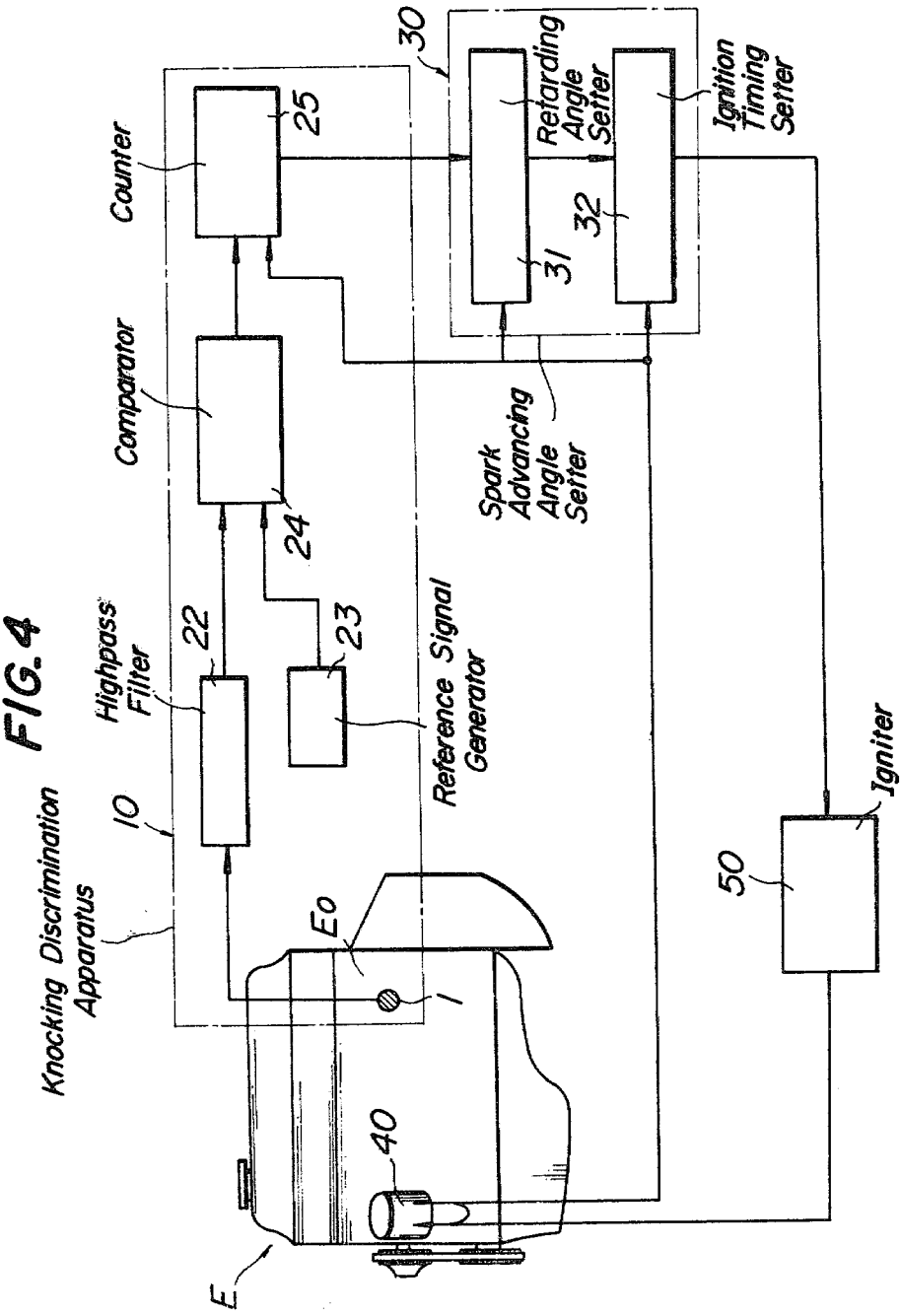
FIG. 4 is a block diagram showing an example of an ignition timing regulation equipment employing a preferred embodiment of a knocking discrimination apparatus according to the present invention.

Firstly, a preferred embodiment of the present invention is shown in FIG. 4, in which such a case is indicated that a knocking discrimination apparatus is utilized for suppressing the knocking by adjusting the ignition timing based on the result of the discrimination of the knocking in consideration that the ignition timing exerts the most important effect upon the knocking. In FIG. 4, E denotes an internal combustion engine, 1 denotes a knocking sensor fitted on a cylinder block $E_0$ of the engine E for detecting the vibration caused by the knocking, 10 denotes a knocking discrimination apparatus, and further 30 denotes a spark advancing angle setter for setting the ignition timing by controlling an ignitor 50 which applies an ignition signal to a distributor 40.

Figure 5:
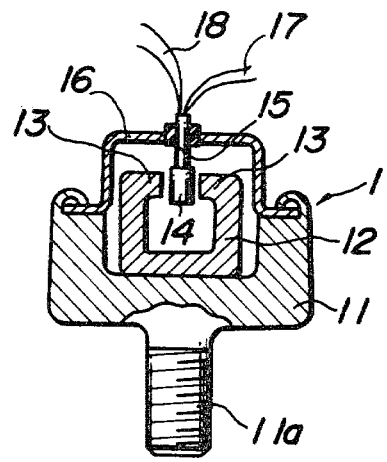
FIG. 5 is a cross-sectional view showing an example of a knocking sensor employed therein.
Figure 6:
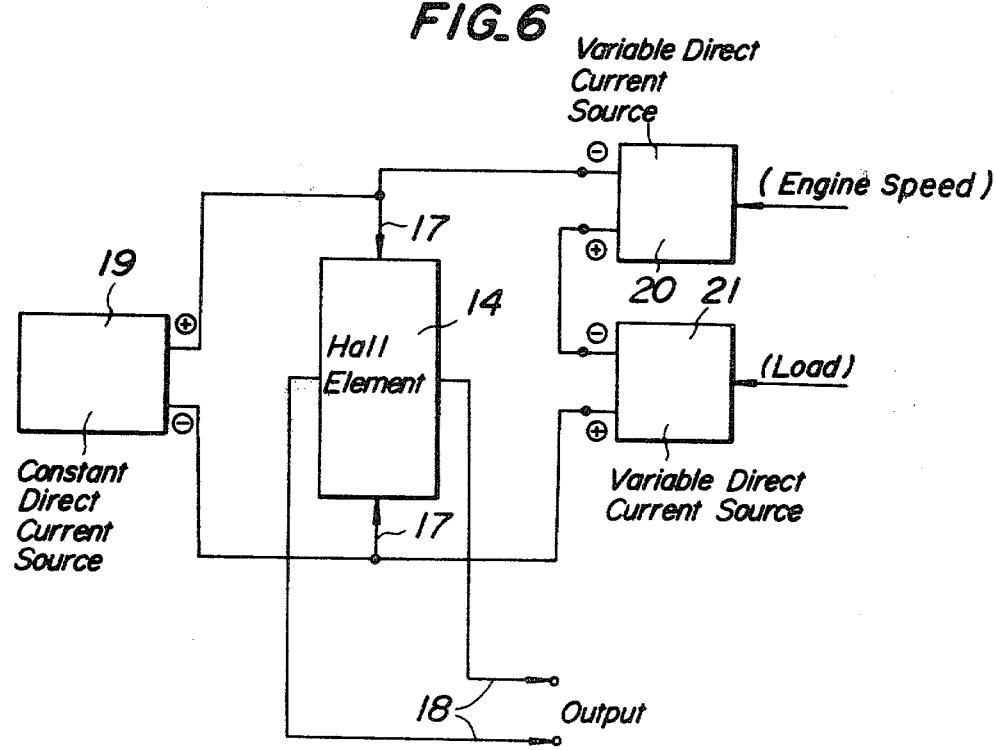
FIG. 6 is a block diagram showing an example of a driving circuit for a Hall element used in the preferred embodiment of the knocking discrimination apparatus according to the present invention.

In the above mentioned knocking sensor 1, as shown in FIG. 5, a magnet 12 formed as a resonant frequency thereof coincides with the knocking frequency, between magnetic poles 13 of which a Hall element 14 is disposed, is mounted on the cylinder block $E_0$ of the engine proper E by screwing a screw portion 11 thereof into the cylinder block $E_0$. The Hall element 14 is fixed on a cover 16 through an elastic member or an insulator 15 and connected with lead wires 17, 18 which pass through the elastic member or the insulator 15 similarly. As shown in FIG. 6, the Hall element 14 is connected with output terminals through the lead wires 18, as well as connected with a constant direct current source 19 for provided as a source of an input current of the Hall element through the lead wires 17 and further in parallel with variable direct current sources 20 and 21 which are connected in series with each other and in opposite polarity to the source 19. In these variable direct current sources 20 and 21, the currents or voltages threof are varied in response to the variation of the operating condition of the engine, for instance, the engine speed, the load and others thereof respectively. Moreover, the maximum value of the sum of the voltages derived respectively from these variable direct current sources 20, 21 is smaller than the maximum voltage of the direct current source 19.

The knocking discrimination apparatus 10 is provided with a highpass filter 22 for passing high frequency components of the output signal of the Hall element 14 as well as with a reference signal generator 23 for generating a reference signal the level of which is predetermined previously, so as to compare these signals with each other in a comparator 24. Furthermore, in a counter 25, the output of the comparator 24 is counted according to the ignition point signal applied from the distributor 40 and forms a knocking discrimination output signal whenever the result of the count thereof reaches to a certain predetermined amount.

The above mentioned spark advancing angle setter 30 consists of a retarding angle setter 31 for generating a retarding angle signal based on the output of the counter 25 and an ignition timing setter 32 for controlling the ignition timing signal according to an equally leading angle integration signal based on the aforesaid ignition point signal, so as to control the ignition timing by controlling the aforesaid ignitor 50 according to the above mentioned ignition timing signal.

Nextly, the behaviour of the preferred embodiment shown in FIG. 4 will be explained hereinafter.

Figure 7:
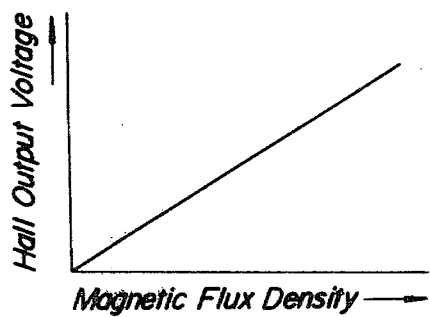
FIGS. 7 and 8 are graphs showing examples of the property of the Hall element used therein respectively.
Figure 8:
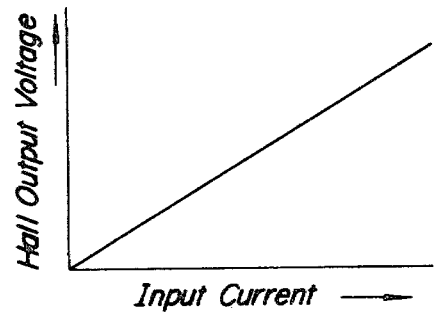

When the knocking takes places in the internal combustion engine E, the magnet 12 fixed on the sensor 1 resonates to the knocking vibration by being vibrated in response to the knocking vibration. As a result thereof, a magnetic field formed between the magnetic poles 13 is varied, so as to cause the variation of the output voltage of the Hall element 14 in response to the knocking vibration. Consequently, the output voltage of the Hall element 14 is varied as shown in FIG. 7 according to the magnetic flux density in a direction being perpendicular to that of the input current thereof. Furthermore, as shown in FIG. 8, the output voltage of the Hall element 14 is varied linearly according to the input current thereof also. Accordingly, it is possible to realize the variation of the output level of the knocking sensor 1 in response to the variation of the amplitude of vibration thereof by means of varying the output level of the knocking sensor 1 according to the input current thereof, so as to utilize the above mentioned performance thereof, in case the aforesaid amplitude of vibration thereof is varied according to the vibration of noises incoming into the knocking sensor 1.

Figure 9A:
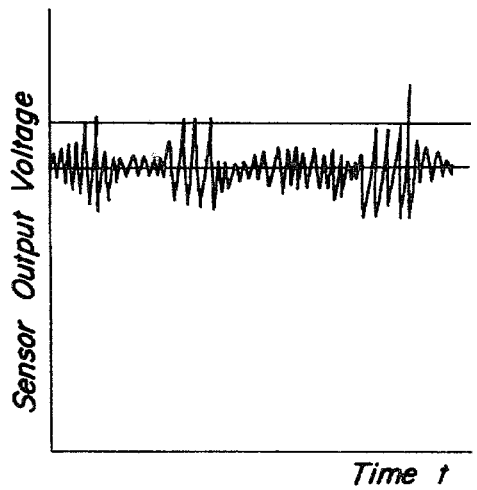
FIGS. 9(a) and (b) are graphs showing examples of the behaviour of the preferred embodiment of the knocking discrimination apparatus according to the present invention respectively.
Figure 9B:
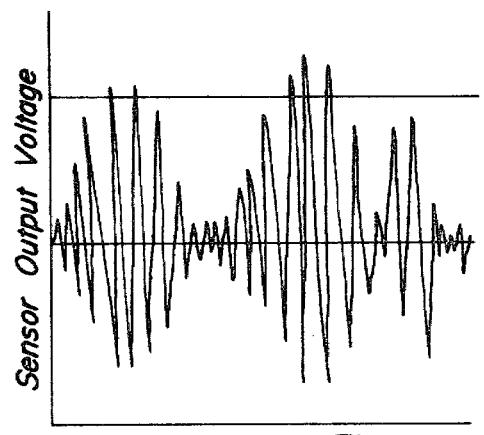

That is, as explained above by referring to FIG. 6, although the noises incoming into the knocking sensor 1 are increased with the variation of the engine speed and the load of the engine E and as a result thereof the amplitude of the output of the knocking sensor 1 is increased, the input current incoming from the direct current source 19 into the Hall element 14 is decreased with the increase of the voltages applied from the direct current sources 20 and 21, so that, as shown in FIG. 9, the bias voltage for the output voltage of the knocking sensor 1 is lowered, for instance, from that shown in FIG. 9(a) to that shown in FIG. 9(b), and as a result thereof, the level of the maximum value of the output of the knocking sensor 1 can be held at an almost constant level.

By the way, the above mentioned control of the output level of the knocking sensor 1 can be effected similarly in case the Hall element 14 is replaced with a magnetoresistive element.

Nextly, the output signal derived from the knocking sensor 1 as shown in FIG. 10(a) is deformed as shown in FIG. 10(b) by passing through a highpass filter 22, so as to be compared with the constant level of the reference signal in the comparator 24. As a result thereof, the output signal of the comparator 24 is formed of pulsive signals which are generated whenever the peaks of the vibration caused by the knocking exceed the constant level of the reference signal as shown in FIG. 10(c). Furthermore, whenever the number of those pulsive signals generated during each interval of the reset signals caused by the ignition point signal as shown in FIG. 10(e), the number of those pulsive signals is counted by the counter 25, so as to form such pulses as shown in FIG. 10(d) as a result of the discrimination of the degree of the knocking which discrimination is effected as the faculty of the knocking discrimination apparatus according to the present invention.

Moreover, in the spark advancing angle setter 30, as shown in FIGS. 11(a) to (e), the equally advancing angle integration shown in FIG. 11(c) is started at every trailing edges of the ignition point signals shown in FIG. 11(b), and then is sliced with respect to a certain dc voltage level, so as to set an advancing angle of the ignition timing signal. That is, the ignition point signals are added previously with a dc bias voltage which is selected in such a manner that the retarding angle thereof becomes to 0°, and then added further with another bias voltage having a waveform which corresponds to respective retarding angles as shown in FIG. 11(d). The bias voltage having the above mentioned waveform can be formed by discharging an electric charge charged into a capacitor in response to the knocking discrimination signal applied from the counter 25 as shown in FIG. 11(a), through an appropriate discharging resistor, and further the recovery time duration of the retarding angle signal shown in FIG. 11(d) determined by the above mentioned bias voltage can be settled arbitrarily by selecting the resistance of the aforesaid discharging resistor. Furthermore, it is possible for the ignition point signals to be added further with still another bias voltage corresponding to a certain retarding angle with respect to the retarding angle signal voltage settled at a timing at which the knocking discrimination signal is applied in the midst of the recovery time duration thereof. According to these procedures, it is possible to control the retarding angle of the ignition timing signal in response to the degree of the knocking. That is, the necessary advancing angle is settled according to the retarding angle resulted from these procedures and the equally advancing angle thereof, so that, only when the retarding angle is caused, the ignition timing signal shown in FIG. 11(e) is applied to the ignitor 50, so as to cause the spark in the ignition plug. Consequently, it can be realized that the retarding angle of the ignition timing signal is controlled stepwise in response to the degree of knocking, as shown in FIGS. 11(a) to (e), so as to prevent the injurious effect of the knocking.

Another preferred embodiment of the knocking discrimination apparatus according to the present invention is shown in FIG. 12. In this embodiment, the output signal of the knocking sensor 1 is held at an almost constant level regardless of the operating condition of the engine by an automatic gain control circuit 27, namely an AGC circuit, so as to be compared with the constant level of the reference signal derived from the reference signal generator 23 in the comparator 24. In FIG. 12, 1 denotes a knocking sensor and 26 denotes a filter, so that the knocking sensor 1 can be provided with a flat frequency response characteristic, as well as with the resonance being coincident with the knocking frequency. In case the knocking sensor 1 is provided with the flat frequency response characteristic, the filter 26 is formed of a bandpass filter, in a passband of which the knocking frequency is included. On the other hand, in case the knocking sensor 1 is provided with the resonance property, the filter 26 is formed of a highpass filter. Further, the AGC circuit 27 is provided with such a performance that an almost constant output signal can be derived therefrom, regardless of the amplitude of the output signal of the filter 26. This output signal derived from the AGC circuit 27 and the reference signal derived from the reference signal generator 23 are applied together to the comparator 24, from which an output pulse is applied to the counter 25, whenever the output signal of the AGC circuit 27 exceeds the reference signal. In the counter 25, whenever a predetermined number of the output pulses derived from the comparator 24 are applied thereto during each one of ignition intervals, the discrimination of knocking is performed.

Apparently from the explained above, in the knocking discrimination apparatus according to the present invention, it is possible that the output signal derived from the knocking sensor is held at an almost constant level regardless of the operating condition of the internal combustion engine by means of providing a control circuit therein for controlling the aforesaid output signal to be held at the almost constant level, and further the above constantly held output signal of the knocking sensor and the constantly settled reference signal are compared with each other, so as to perform the discrimination of the knocking. So that such a remarkable effect can be obtained according to the present invention that the reliability of the discrimination of knocking is improved exceedingly on account of a reliable reference signal for comparison which is ensured by being maintained at a predetermined constant level persistently and stably.

What is claimed is:

1. A knocking discrimination apparatus for discriminating a degree of knocking taking place in an internal combustion engine, wherein an output signal of a knocking sensor for detecting a vibration caused by the knocking is compared with a reference signal for the discrimination of knocking, comprising:
   a control circuit for controlling a peak level of the output signal of said knocking sensor to be held at a substantially constant level regardless of an operating condition of the internal combustion engine, so as to compare the controlled peak level of said output signal with said reference signal which has a constant level for the discrimination of knocking;
   a high pass filter for passing selectively at least high frequency components of said output signal; and
   a counter for counting said high frequency components caused by the excess of the peak level of said output signal above the constant level of the reference signal, said counter indicating the degree of knocking present in said engine.

2. A knocking discrimination apparatus as claimed in claim 1, wherein said knocking sensor comprises:
   a magnet provided with a resonant frequency which coincides nearly with a frequency of said vibration caused by the knocking, and
   a magnetic field sensitive element disposed in a magnetic field which is formed by said magnet; and
   said control circuit controls a direct current which is supplied to said element in response to the operating condition of the internal combustion engine, so as to hold a level of an output voltage of said element at the substantially constant level.

3. A knocking discrimination apparatus as claimed in claim 2, wherein said control circuit comprises
   a direct current source for supplying a constant direct current to said element, and
   at least one variable direct current source for supplying a variable direct current in opposite polarity to said constant direct current which variable direct current is varied at least with response to the operating condition of the internal combustion engine.

4. A knocking discrimination apparatus as claimed in claim 2, wherein said magnetic field sensitive element comprises a Hall element.

5. A knocking discrimination apparatus as claimed in claim 2, wherein said magnetic field sensitive element comprises a magnito-resistive element.

6. A knocking discrimination apparatus as claimed in claim 1, wherein said knocking sensor comprises
   a magnet provided with a resonant frequency which coincides nearly with a frequency of said vibration caused by the knocking, and
   a magneto-resistive element disposed in a magnetic field which is formed by said magnet; and
   said control circuit controls a direct current which is supplied to said magneto-resistive element in response to the operating condition of the internal combustion engine, so as to hold a level of an output voltage of said magneto-resistive element at the almost constant level.

7. A knocking discrimination apparatus as claimed in claim 6, wherein said control circuit comprises
   a direct current source for supplying a constant direct current to said magneto-resistive element, and
   at least one variable direct current source for supplying a variable direct current in opposite polarity to said constant direct current which variable direct current is varied at least with response to the operating condition of the internal combustion engine.

* * * * *